US009293044B2

(12) United States Patent
Chen

(10) Patent No.: US 9,293,044 B2
(45) Date of Patent: Mar. 22, 2016

(54) COOPERATIVE VEHICLE COLLISION WARNING SYSTEM

(71) Applicant: FUJITSU LIMITED, Kawasaki-shi, Kanagawa (JP)

(72) Inventor: Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/532,978

(22) Filed: Nov. 4, 2014

(65) Prior Publication Data
US 2015/0054659 A1 Feb. 26, 2015

Related U.S. Application Data

(63) Continuation of application No. 13/330,093, filed on Dec. 19, 2011, now Pat. No. 8,907,814.

(51) Int. Cl.
G08G 1/09 (2006.01)
G08G 1/0967 (2006.01)
G08G 1/16 (2006.01)
B60W 10/06 (2006.01)
G08G 1/01 (2006.01)
G08G 1/015 (2006.01)
B60W 10/18 (2012.01)
(Continued)

(52) U.S. Cl.
CPC ......... *G08G 1/096791* (2013.01); *B60W 10/06* (2013.01); *G08G 1/093* (2013.01); *G08G 1/094* (2013.01); *G08G 1/096716* (2013.01); *G08G 1/096741* (2013.01); *G08G 1/096758* (2013.01); *G08G 1/096783* (2013.01); *G08G 1/162* (2013.01); *B60W 10/18* (2013.01); *B60W 40/06* (2013.01); *B60W 2050/008* (2013.01); *B60W 2550/408* (2013.01); *G08G 1/01* (2013.01); *G08G 1/015* (2013.01); *G08G 1/0112* (2013.01); *G08G 1/0116* (2013.01); *G08G 1/0967* (2013.01); *G08G 1/096708* (2013.01); *G08G 1/096725* (2013.01)

(58) Field of Classification Search
CPC .............................. G08G 1/093; G08G 1/094
USPC ........................................................ 340/905
See application file for complete search history.

(56) References Cited

U.S. PATENT DOCUMENTS 5,208,756 A * 5/1993 Song ............................ 455/456.3
6,534,884 B2 3/2003 Marcus et al.
7,561,099 B2 7/2009 Wakayama et al.
(Continued)

OTHER PUBLICATIONS

Wikipedia, "Vehicular communication systems", 2011, Wikimedia Foundation, Inc., retrieved Dec. 19, 2011, <http://en.wikipedia.org/wiki/Vehicular_communication_systems>.
(Continued)

*Primary Examiner* — Steven Lim
*Assistant Examiner* — Benyam Haile
(74) *Attorney, Agent, or Firm* — Maschoff Brennan

(57) ABSTRACT

According to an aspect of the invention, a traffic information communication system includes a receiver and a transmitter. The receiver may be configured to receive a message relating to traffic conditions along a thoroughfare from a communication node. The transmitter may be communicatively coupled to the receiver and may be configured to rebroadcast the message within a predetermined amount of time after receiving the message. The traffic information communication system may be implemented in a vehicle traveling along the thoroughfare.

20 Claims, 5 Drawing Sheets

(51) Int. Cl.
*B60W 40/06* (2012.01)
*B60W 50/00* (2006.01)

(56) References Cited

U.S. PATENT DOCUMENTS

2008/0133136 A1* 6/2008 Breed et al. .................. 701/301
2011/0196580 A1* 8/2011 Xu et al. ....................... 701/48
2012/0038508 A1* 2/2012 Mizuochi et al. ........ 342/357.23
2013/0083679 A1* 4/2013 Krishnaswamy et al. .... 370/252

OTHER PUBLICATIONS

RITA (Research and Innovative Technology Administration), "Vehicle-to-Vehicle (V2V) Communications for Safety", 2011, U.S. Department of Transportation, retrieved Dec. 19, 2011, <http://www.its.dot.gov/research/v2v.htm>.
Dedicated Short Range Communitications Service, "Dedicated Short Range Communications (DSRC) Service", 2004, Federal Communitcations Commission, <http://wireless.fcc.gov/services/index.htm?job=service_home&id=dedicated_src>.
Gordon Peredo et al., "Safe in Traffic", Oct. 1, 2006, GPS World, <http://www.gpsworld.com/transportation/road/safe-traffic-6543>.
Michele Weigle, Dr., "Standards:WAVE / DSRC / 802.11p Outline", 2008, Old Dominion University, College of Science, <http://www.cs.odu.edu/~mweigle/courses/cs795-s08/lectures/5c-DSRC.pdf>.
Xue Yang et al., "A Vehicle-to-Vehicle Communication Protocol for Cooperative Collision Warning," The 1st International Conference on Mobile and Ubiquitous Systems: Networking and Services (Mobiquitous 2004), Boston, MA, Aug. 22-26, 2004.
Tatsuaki Osafune et al., "Multi-Hop Vehicular Broadcast (MHVB)", ITST 2006, Chengdu, China, Jun. 2006.
Uttamkumar Dravidam et al., "A Survey on Automobile Collision Avoidance System," 1999, Florida conference on recent advances in robotics, <http://www.engr.uconn.edu/ece/SeniorDesign/projects/ecesd32/Project%20Materials/Support.pdf>.
Goekhan Korkmaz et al., "Urban Multi-Hop Broadcast Protocol for Inter-Vehicle Communication Systems", 2004, Ohio State University, Electrical & Computer Engineering, <http://www2.ece.ohio-state.edu/~ekici/papers/umb.pdf>.
Wireless Communication, "Doppler spectrum", 1995, Chapter: Wireless Channels, Section:Fading, <http://wireless.per.nl/reference/chaptr03/fading/doppler.htm>.
RITA (Research and Innovative Technology Administration), "Vehicle-to-Vehicle (V2V) Communications for Safety", 2011, U.S. Department of Transportation, retrieved Dec. 19, 2011, <http://www.its.dot.gov/factsheets/pdf/JPO-029%20V2V%20SAFETY%20V5.1%20F.pdf>.
Lachlan B. Michael et al., "Non-Platoon Inter-Vehicle Communication Using Multiple Hops," IEICE Transactions on Communications vol. E82-B No. 10, Oct. 20, 1999.

* cited by examiner

COOPERATIVE VEHICLE COLLISION WARNING SYSTEM

CROSS-REFERENCE TO RELATED APPLICATIONS

This patent application is a continuation of U.S. patent application Ser. No. 13/330,093, filed Dec. 19, 2011, which is incorporated herein by reference.

FIELD

The embodiments discussed herein are related to vehicular communication systems.

BACKGROUND

Many vehicles include brake lights that turn on when a vehicle's brakes are applied by the driver. The brake lights may thus serve to warn other drivers behind the vehicle when the vehicle is slowing down so that the other drivers may also slow down and avoid a collision with the vehicle.

There are some cases where brake lights are ineffective for warning other drivers that the vehicle is slowing down. For instance, a driver in a rear vehicle behind a front vehicle may be unable to see the front vehicle's brake lights without a direct line-of-sight between the driver of the rear vehicle and the front vehicle's brake lights. If the vehicles are going around a sharp turn or any intervening vehicles are between the front vehicle and the rear vehicle, the driver of the rear vehicle may be unable to see the front vehicle's brake lights and may therefore not be warned when the brakes of the front vehicle are applied. Similarly, weather conditions such as fog, heavy rain, and/or heavy snow may limit the transmission range of the brake lights, the brake lights may malfunction, and/or the driver of the rear vehicle may simply not be paying attention to the front vehicle's brake lights.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of the invention, a traffic information communication system includes a receiver and a transmitter. The receiver may be configured to receive a message relating to traffic conditions along a thoroughfare from a communication node. The transmitter may be communicatively coupled to the receiver and may be configured to rebroadcast the message within a predetermined amount of time after receiving the message. The traffic information communication system may be implemented in a vehicle traveling along the thoroughfare.

The object and advantages of the embodiments will be realized and achieved by means of the elements and combinations particularly pointed out in the claims.

It is to be understood that both the foregoing general description and the following detailed description are exemplary and explanatory and are not restrictive of the invention, as claimed

BRIEF DESCRIPTION OF THE DRAWINGS

Example embodiments will be described and explained with additional specificity and detail through the use of the accompanying drawings in which.

DESCRIPTION OF EMBODIMENTS

Vehicular communication systems enable vehicles to wirelessly communicate with each other to exchange traffic information and/or generate safety warnings depending on the traffic information. Some vehicular communication systems are limited to single-hop solutions. That is, messages are typically only transmitted from one communication node to the next without being rebroadcast. As such, single-hop solutions have limited coverage.

Other vehicular communication systems include multiple-hop solutions that are still under development. Many multiple-hop solutions are operated at the 5.9 gigahertz (GHz) Dedicated Short Range Communication (DSRC) communication band and/or are based on the Wireless Access in Vehicular Environments (WAVE)/IEEE P1609/IEEE 802.11p standards covering a wide range of applications including electronic payments. The medium access control (MAC) layer of the IEEE 802.11p standard is based on carrier sense multiple access (CSMA) in which transmissions are only made if a shared transmission medium is available. Thus, multiple-hop solutions based on the IEEE 802.11p standard cannot tolerate multiple simultaneous messages.

Accordingly, some embodiments described herein include a cooperative vehicle collision warning system in which messages from event sources are propagated to all potentially affected vehicles within a response time to prevent potential collisions. In response to receiving a message relating to an imminent threat on a road or other thoroughfare ahead of a vehicle, the vehicle may issue a warning such as a verbal warning or sound to advise the driver to slow down or take some other appropriate action. In some cases, the vehicle may autonomously rebroadcast the message to other vehicles independent of the driver's response.

The cooperative vehicle collision warning system may implement a multiple access method that may tolerate multiple simultaneous messages. Alternately or additionally, the multiple access method may allow messages to be rebroadcast within a given time without first checking to see if a shared transmission medium is available as is done in CSMA. As such, the multiple access method may include, for instance, code division multiple access (CDMA).

Embodiments of the present invention will now be explained with reference to the accompanying drawings.

Figure 1:
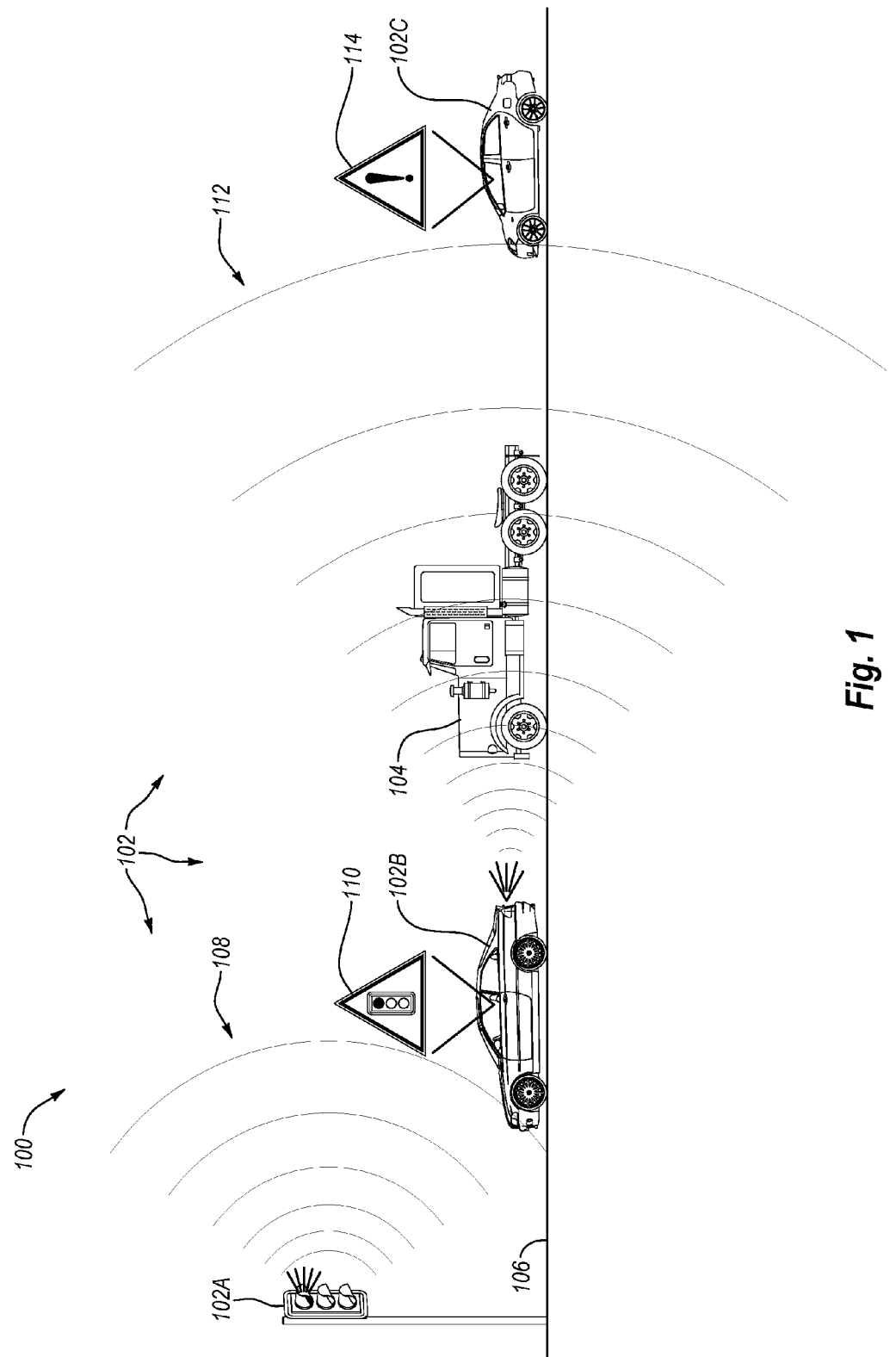
FIG. 1 illustrates an example operating environment in which embodiments of a cooperative vehicle collision warning system may be implemented.

FIG. 1 illustrates an example operating environment 100 in which embodiments of a cooperative vehicle collision warning system 102 may be implemented, arranged in accordance with at least some embodiments described herein. The cooperative vehicle collision warning system 102 may include one or more infrastructure elements 102A and one or more vehicles 102B, 102C. Each of the infrastructure element 102A and vehicles 102B, 102C in the cooperative vehicle collision warning system 102 may include a traffic information communication system (not depicted in FIG. 1) configured to send and/or receive data to and/or from other infrastructure elements or vehicles that also include a suitable traffic information communication system. As such, the infrastructure element 102A and vehicles 102B, 102C may be generically referred to as communication nodes.

The operating environment 100 may additionally include other infrastructure elements (not shown) that are not part of the cooperative vehicle collision warning system 102, other vehicles 104 that are not part of the cooperative vehicle collision warning system 102, and/or one or more thoroughfares 106 along which vehicles travel.

The infrastructure element 102A depicted in FIG. 1 may include a traffic light, for instance. More generally, the infrastructure element 102A may include an element or structure positioned on, above, beside or otherwise near the thoroughfare 106. As such, infrastructure elements included in the cooperative vehicle collision warning system 102 may include, but are not limited to, signs, light posts, traffic cameras, bridges, buildings, or the like. While only a single infrastructure element 102A is illustrated in FIG. 1, in general the cooperative vehicle collision warning system 102 may include any number of infrastructure elements.

The vehicles 102B and 102C depicted in FIG. 1 include automobiles. More generally, the vehicles 102B, 102C may include virtually any vehicle that operates in environments that include other vehicles where it is desirable to avoid collisions. Thus, while the vehicles 102B, 102C depicted in FIG. 1 are automobiles, a cooperative vehicle collision warning system 102 such as that described herein may be implemented with automobiles, motorcycles, boats, planes, construction machinery, or other vehicles. While two vehicles 102B, 102C are illustrated in FIG. 1, in general the cooperative vehicle collision warning system 102 may include any number of vehicles.

As previously mentioned, each of the infrastructure element 102A and vehicles 102B, 102C may include a traffic information communication system that allows the infrastructure element 102A and/or the vehicles 102B, 102C to send and/or receive data to/from each other and/or to/from other infrastructure elements or vehicles. In these and other embodiments, data exchange between an infrastructure element, such as the infrastructure element 102A, and a vehicle, such as either of the vehicles 102B, 102C, may be referred to as vehicle-to-infrastructure (V2I) communication. Alternately or additionally, data exchange between two vehicles, such as the vehicles 102B, 102C, may be referred to as vehicle-to-vehicle (V2V) communication.

The data exchanged between the components in the cooperative vehicle collision warning system 102 may include messages relating to traffic conditions along the thoroughfare 106. For example, the infrastructure element 102A depicted in FIG. 1 as a traffic light may generate and broadcast messages indicating when the traffic light is about to transition from green to red to warn approaching vehicles to slow down. The broadcast of the message by the infrastructure element 102A is generally depicted in FIG. 1 at 108. If the thoroughfare 106 is curved or has a bend near the infrastructure element 102A such that approaching vehicles lack a direct or clear line-of-sight to the infrastructure element 102A, and/or under other circumstances, broadcasting such messages to approaching vehicles may reduce the likelihood of vehicle collisions. Alternately or additionally, the infrastructure element 102A may generate and broadcast other messages relating to traffic conditions, and/or may rebroadcast messages received from other infrastructure elements or vehicles in the cooperative vehicle collision warning system 102.

In response to receiving the message from the infrastructure element 102A, the vehicle 102B may be configured to, among other things, initiate a warning, depicted at 110, to a driver of the vehicle 102B. To the extent the warning 110 is initiated before the driver of the vehicle 102B would have otherwise noticed the traffic condition identified by the message, the driver will have relatively more time to react to the traffic condition. Alternately or additionally, the vehicle 102B may be configured to rebroadcast the message, as depicted in FIG. 1 at 112, to other vehicles in the cooperative vehicle collision warning system 102, such as to the vehicle 102C.

The vehicle 102C may determine that the traffic conditions identified in the message received from the vehicle 102B do not pose an immediate threat to the vehicle 102C, but may merit additional consideration as depicted at 114. For instance, based on a deceleration of the source which sends the message, e.g., the vehicle 102B, or a distance between the source which sends the message and the vehicle 102C, or the content of the message, or the like or any combination thereof, the vehicle 102C may determine that no immediate action is needed or desired. Instead, the vehicle 102C may wait a certain amount of time for a driver of the vehicle 102C to brake before initiating a warning, such as the warning 110 initiated for the driver of the vehicle 102B.

Alternately or additionally, either of the vehicles 102B, 102C may initiate autonomous control of an aspect of operation of the vehicle 102B, 102C. For instance, the vehicle 102B, 102C may autonomously, e.g., without human intervention, apply the brakes or cancel cruise control to cause the vehicle 102B, 102C to decelerate or control some other aspect of operation of the vehicle 102B, 102C.

More generally, vehicles in the cooperative vehicle collision warning system 102, such as the vehicles 102B, 102C, may be configured to detect hazards and notify other vehicles about the hazards in advance through multi-hop communications. Hazards may be detected by receiving a message or messages from an infrastructure element or another vehicle in the cooperative vehicle collision warning system 102, which message may then be rebroadcast to other vehicles. Alternately or additionally, hazards may be detected at the vehicle or an infrastructure element, and a message may then be generated at the vehicle or the infrastructure element and broadcast to other vehicles or infrastructure elements in the cooperative vehicle collision warning system 102.

In general, a message may be generated at a source in response to detecting any one of various triggers at the source. A source may include an infrastructure element or a vehicle in the cooperative vehicle collision warning system 102 of FIG. 1. For instance, a message may be generated in response to detecting, at the source, the application of vehicle brakes, a sudden change of speed—such as abrupt deceleration, a vehicle or vehicle component failure, a traffic light turning red, a congested traffic condition captured via surveillance cameras or the like. The message may carry information including, but not limited to, current speed, deceleration, message trigger, number of propagated hops, vehicle location, a vehicle identifier (ID), lane positioning information, or the like or any combination thereof.

A message received at one vehicle, such as the vehicle 102B, may be rebroadcast if the vehicle 102B determines that the traffic conditions identified by the message may affect other vehicles traveling along the thoroughfare 106. For instance, if the vehicle 102B is within a predetermined proximity from a source of the message, or if the vehicle 102B receives multiple identical messages from different communication nodes in front of the vehicle 102B, or if a driver of the vehicle 102B applies the vehicle's 102B brakes or otherwise confirms a threat represented by the message, the vehicle 102B may determine that the traffic conditions may affect other vehicles traveling along the thoroughfare 106 and may rebroadcast the message.

The vehicle 102B may be configured to rebroadcast a message within a predetermined amount of time after receiving the message. Transmitting, e.g., broadcasting or rebroadcasting, within the predetermined amount of time may increase a probability of timely delivery to other vehicles. Alternately or additionally, the vehicle 102B may transmit multiple messages at substantially the same time and/or may be one of multiple vehicles that are transmitting messages at substantially the same time. Accordingly, in these and other embodiments, the vehicle 102B may implement a multiple access method that permits message transmission within the predetermined amount of time and with sufficient resources for multiple messages to be transmitted at substantially the same time with a relatively low probability of message collisions.

For example, each vehicle 102B, 102C may be assigned a unique resource block based on vehicle identification number (VIN) or the like to prevent primary collisions. In this example, the probability of a message collision may be close to zero.

As another example, a resource block such as a code may be generated from a hash table when a message is transmitted. In this example, the probability of a message collision may be close to the probability of a collision in the hash table.

As another example, a pool of resource blocks may be available to all vehicles 102B, 102C. When transmitting a message, each vehicle 102B, 102C may randomly select a resource block from the pool. In this example, the probability of a message collision may be estimated as the probability that two vehicles pick the same code from the pool.

In these and other embodiments, a resource block may include, but is not limited to, a code, a frequency subcarrier, a set of frequency subcarriers transmitted over one symbol, or the like.

Non-limiting examples of suitable multiple access methods that may be implemented by vehicles 102B, 102C in the cooperative vehicle collision warning system 102 include code division multiple access (CDMA), frequency division multiple access (FDMA), and orthogonal frequency division multiple access (OFDMA). For instance, a CDMA transmitter such as may be implemented in the vehicle 102B may transmit a message whenever the message is ready, in contrast to protocols such as CSMA implemented in the WAVE/IEEE P1609/IEEE 802.11p protocol in which a message is only sent in the absence of traffic on a shared transmission medium. Additionally, a CDMA receiver may be implemented in the vehicle 102B that may simultaneously decode multiple received messages with different codes.

By configuring the cooperative vehicle collision warning system 102 to tolerate multiple messages at substantially the same time, also referred to as message flooding, different levels of message urgency may be determined based on the number of redundant messages received at the vehicle 102B. Different levels of message urgency may alternately or additionally be determined based on the transmission power of the messages. Alternately or additionally, tolerating multiple messages at substantially the same time may enhance the robustness of the cooperative vehicle collision warning system 102 insofar as redundancy in a broadcast system without guaranteed delivery may increase the likelihood that at least one of the redundant messages may be received and decoded correctly at each of the intended recipients.

Figure 2:
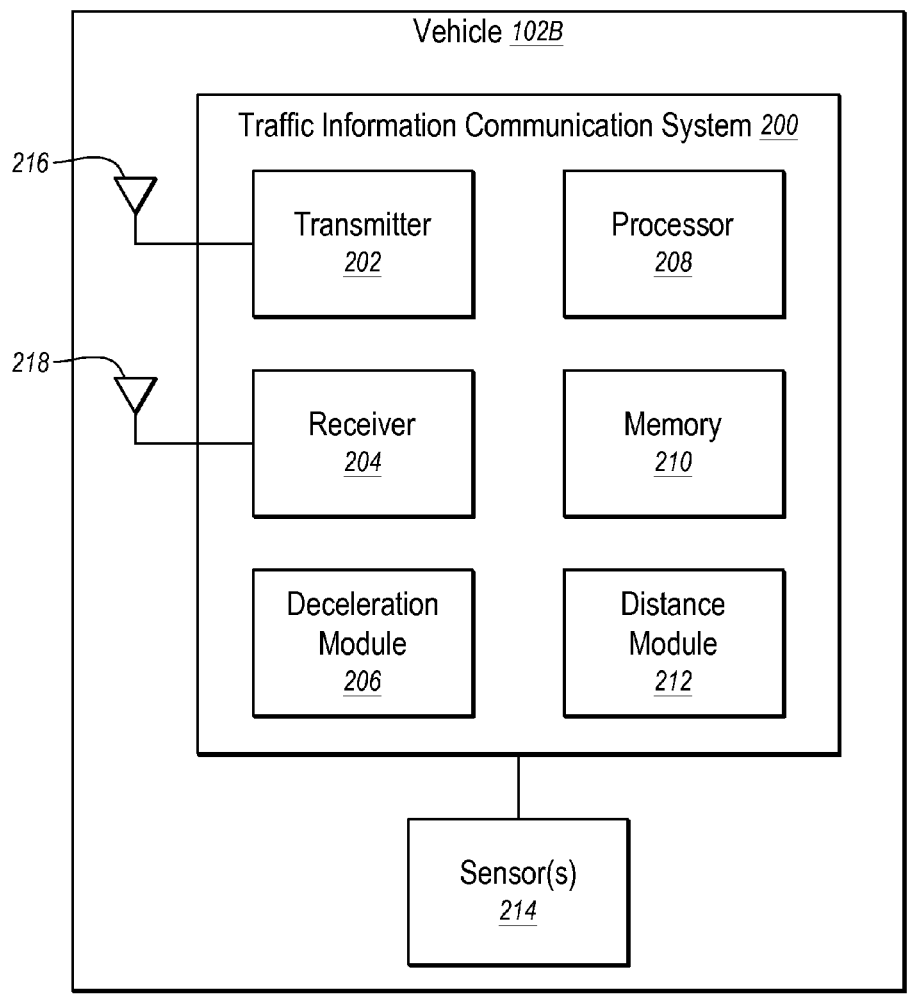
FIG. 2 is a block diagram of an example traffic information communication systems that may be included in the cooperative vehicle collision warning system of FIG. 1.

FIG. 2 is a block diagram of an example traffic information communication system 200 that may be included in the cooperative vehicle collision warning system 102 of FIG. 1, arranged in accordance with at least some embodiments described herein. More particularly, each of the infrastructure element 102A and vehicles 102B, 102C may include a traffic information communication system such as that illustrated at 200 in FIG. 2. The traffic information communication system 200 is illustrated in FIG. 2 as included in the vehicle 102B of FIG. 1 with the understanding that the infrastructure element 102A and vehicle 102C may each include a similarly configured traffic information communication system 200.

The traffic information communication system 200 may include at least a transmitter 202 and a receiver 204. In the illustrated embodiment, the receiver 204 is configured to receive messages relating to traffic conditions from communication nodes, such as the infrastructure element 102A or vehicle 102C of FIG. 1. The transmitter 202 may be communicatively coupled to the receiver 204 and is configured to rebroadcast the message within a predetermined amount of time after receiving the message. Accordingly, the receiver 204 may include a CDMA receiver, an FDMA receiver, an OFDMA receiver, or the like, and the transmitter 202 may include a CDMA transmitter, an FDMA transmitter, an OFDMA transmitter, or the like.

In embodiments in which CDMA is implemented, a pool of CDMA codes, also known as a CDMA code space, may be available to transmitters, such as the transmitter 202, in the cooperative vehicle collision warning system 102. The number of CDMA codes in the CDMA code space may depend on available bandwidth and targeted data rate. In these and other embodiments, the transmitter 202 may randomly select a code from the CDMA code space each time it sends a message. Alternately or additionally, each vehicle 102B, 102C may be assigned a unique CDMA code based on a VIN number of the corresponding vehicle. Alternately or additionally, each vehicle 102B, 102C may generate CDMA codes from a hash table.

Alternately or additionally, the CDMA codes in the CDMA code space may be categorized according to urgency. More generally, the resource blocks in the corresponding resource block space, such as the resource block space corresponding to CDMA, FDMA or OFDMA, may be categorized according to urgency. A message may be considered urgent if, for instance, it relates to traffic conditions that represent an imminent threat to other vehicles. In these and other embodiments, a first set of CDMA codes (or other resource blocks) from the CDMA code space (or other resource block space) may be reserved for urgent warning messages while a second set may be reserved for non-urgent warning messages. In other embodiments, the CDMA codes (or other resource blocks) may be divided into more than two sets reserved for more than two categories of warning messages.

Alternately or additionally, the transmitter 202 may transmit redundant messages depending on the urgency of the message. For instance, the same message may be broadcast over two different CDMA channels, e.g., using two different CDMA codes from the CDMA code space, at substantially the same time. More generally, the same message may be broadcast using two (or more) different resource blocks, the resource blocks depending on the multiple access method. For instance, the resource blocks may include CDMA codes for CDMA, frequency subcarriers for FDMA, or sets of subcarriers transmitted over one symbol for OFDMA. Redundantly broadcasting the same message using different CDMA codes or other resource blocks may decrease the likelihood that a message collision, e.g., with a message from another communication node, will interfere with receipt of the message and may increase the likelihood that a receiver may successfully decode the message using at least one of the CDMA codes or other resource blocks.

Optionally, the traffic information communication system 200 may further include at least one of: a deceleration module 206, a processor 208, a memory 210, a distance module 212, one or more sensors 214, a transmit antenna 216 and a receive antenna 218.

The transmit antenna 216 is coupled to the transmitter 202 and may be configured to emit wireless carrier signals that include messages broadcast by the transmitter 202. The transmit antenna 216 may include a directional antenna. In these and other embodiments, the transmit antenna 216 may be positioned to emit the wireless carrier signals primarily toward a rearward travel path of the traffic information communication system 200. For instance, the transmit antenna 216 may be mounted to the vehicle 102B so as to emit wireless carrier signals behind the vehicle 102B.

The receive antenna 218 is coupled to the receiver 204 and may be configured to receive wireless carrier signals that include the messages relating to traffic conditions that are received by the receiver 204. The receive antenna 218 may include a directional antenna. In these and other embodiments, the receive antenna 218 may be oriented forward with respect to the vehicle 102B so as to primarily receive wireless carrier signals traveling towards the front of the vehicle 102B in a rearward direction with respect to the vehicle 102B. While both a transmit antenna 216 and a receive antenna 218 are depicted in FIG. 2, in other embodiments, a single antenna may be shared between the transmitter 202 and the receiver 204.

The deceleration module 206 may be configured to determine a deceleration of the communication node from which the message is received. The deceleration of the communication node may be determined based on current speed values included in payloads of successive messages from the same communication node. Alternately or additionally, the deceleration module 206 may determine the deceleration of the communication node by measuring a change over time in Doppler shift of a wireless carrier wave of the received message. The deceleration module 206 may be implemented in hardware, software, or a combination thereof.

The distance module 212 may be configured to determine a distance between the communication node and the vehicle 102B, or more particularly, between the communication node and the traffic information communication system 200. The distance module 212 may determine the distance by measuring attenuation of the wireless carrier wave of the received message where an initial transmit power of the wireless carrier wave is known. For instance, the message payload may identify the initial transmit power of the wireless carrier wave. Alternately or additionally, all traffic information communication systems 200 may be configured to transmit with the same default initial transmit power, and the default initial transmit power may be taken as a given unless a different value is specified in the message payload.

In these and other embodiments, the distance module 212 may additionally determine a driving environment of the vehicle 102B, such as rural plain, canyon, city center, or the like. The driving environment may be determined, for instance, based on geo-location information from a navigation system of the vehicle 102B, based on location information from a Global Positioning System (GPS) unit of the vehicle 102B or the traffic information communication system 200, by matching an image of the driving environment captured by a camera of the vehicle 102B to a template, or the like. Based on the measured attenuation and the determined driving environment, a corresponding wave propagation model may be used by the distance module 212 to derive an approximate distance between the communication node and the traffic information communication system 200. The distance module 212 may be implemented in hardware, software, or a combination thereof.

The processor 208 may be configured to execute computer instructions. The computer instructions may be embodied as program code and/or may be loaded to the memory 210 for execution by the processor 208. Execution of the computer instructions by the processor 208 may cause a system, such as the traffic information communication system 200, to perform operations for providing communications regarding traffic conditions, such as those operations described herein. Various example operations for providing communications regarding traffic conditions are described below with respect to FIGS. 4 and 5.

The sensor 214 is installed in the vehicle 102B and may be configured to detect a trigger or triggers. For instance, the sensor 214 may include a brake sensor configured to detect emergent braking in the vehicle 102B. Alternately or additionally, the sensor 214 may include an accelerometer or a GPS unit configured to detect abrupt changes in speed in the vehicle 102B. Alternately or additionally, the sensor 214 may include a component sensor configured to detect failure of a particular component of the vehicle 102B, such as a tire, transmission, engine block, or other component. In these and other embodiments, the transmitter 202 may be configured to generate and broadcast a warning message about a potential safety threat to other vehicles in response to detecting the trigger.

In these and other embodiments, the physical layer over which the traffic information communication system 200 communicates may be slot-based. As such, in some embodiments, a time synchronization module may be provided at both a sending traffic information communication system and a corresponding receiving traffic information communication system for synchronization. Corresponding timing information may be received from a GPS sensor, or the like.

Alternately or additionally, the receiving traffic information communication system may synchronize by decoding the received signal directly. In particular, each physical layer frame may include a preamble and a frame payload transmitted over a slot. By decoding the preamble, the receiving traffic information communication system may be able to synchronize with the sending traffic information communication system without GPS capabilities.

Figure 3:
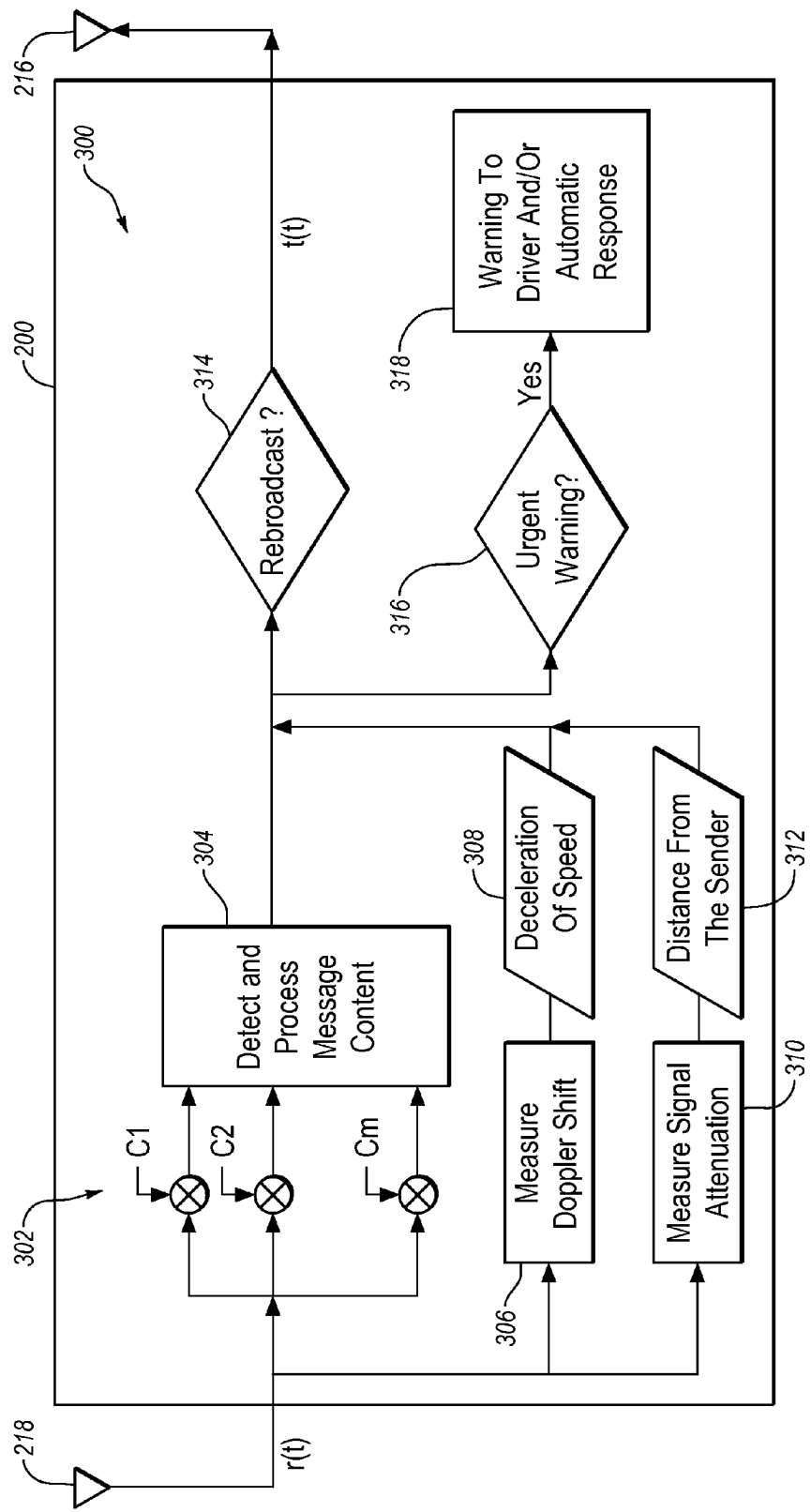
FIG. 3 schematically depicts an example processing flow that may be performed by the traffic information communication system of FIG. 2.

FIG. 3 schematically depicts an example processing flow 300 that may be performed by the traffic information communication system 200 of FIG. 2, arranged in accordance with at least some embodiments described herein. A wireless carrier signal including a message may be received by the receive antenna 218 and converted to an electrical receive signal r(t). In some embodiments, the wireless carrier signal is in the 5.9 GHz DSRC communication band. More generally, the wireless carrier signal may be in any suitable communication band.

In embodiments in which the traffic information communication system 200 implements CDMA, the wireless carrier signal may include a CDMA carrier signal and the electrical receive signal r(t) may be correlated in parallel with each of multiple CDMA codes 302 in a CDMA code space to decode the electrical receive signal r(t) and generate a message that was included in the CDMA carrier signal. The message may relate to traffic conditions along a thoroughfare, such as the thoroughfare 106 of FIG. 1.

At block 304, message content included in the message may be detected and processed. The message content may include, but is not limited to, current speed of a communication node that broadcast the message, deceleration of the communication node, number of propagated hops from an original source of the message, location of the communication node, an ID of the communication node, lane positioning information of the communication node, or the like or any combination thereof. In some embodiments, the parallel correlation with CDMA codes 302 and the detecting and processing at block 304 may be performed by the receiver 204 of FIG. 2, for instance.

At block 306, a Doppler shift of the wireless carrier signal may be measured one or more times over time. More particularly, aspects of the electrical receive signal r(t) may be analyzed to determine the Doppler shift of the corresponding wireless carrier signal received at the receive antenna 218. With at least two successive Doppler shift measurements, a deceleration 308 of the communication node that broadcast the wireless carrier signal may be determined. In some embodiments, the deceleration module 206 of FIG. 2 measures the Doppler shift at block 306 and determines the deceleration 308.

At block 310, a signal attenuation of the wireless carrier signal may be measured to determine a distance 312 between the communication node, or sender, and the traffic information communication system 200. In these and other embodiments, all communication nodes may be configured to broadcast messages at a default initial transmission power. Alternately or additionally, all communication nodes may be configured to indicate an initial transmission power in the message payload. Alternately or additionally, all communication nodes may be configured to indicate an initial transmission power in the message payload if the initial transmission power is anything other than the default initial transmission power. Thus, signal attenuation may be measured by measuring a receive transmission power of the wireless carrier signal and subtracting the receive transmission power from the initial transmission power. The distance 312 may then be determined in some embodiments using a wave propagation module based on the measured signal attenuation and a determined driving environment of a vehicle in which the traffic information communication system 200 is installed as already described above. In some embodiments, the distance module 212 of FIG. 2 measures the signal attenuation and determines the distance 312.

Although not required, in some embodiments, decoding using CDMA codes 302, measuring the Doppler shift at block 306, and measuring signal attenuation at block 310 may be performed simultaneously by the traffic information communication system 200. Alternately or additionally, one or more of decoding using CDMA codes 302, measuring the Doppler shift at block 306, and measuring signal attenuation at block 310 may occur at different times.

At block 314, it is determined whether to rebroadcast the message. In some embodiments, the message is rebroadcast if it is determined that traffic conditions included or described in the message may affect other vehicles on the thoroughfare. Such a determination may be based on one or more of the message content detected and processed at block 304, the deceleration 308, and/or the distance 312. For instance, the traffic information communication system 200 may determine that the traffic conditions may affect other vehicles on the thoroughfare and may rebroadcast the message at block 314 if the traffic information communication system 200 is within a predetermined proximity of a source of the message, or if the traffic information communication system 200 receives redundant messages, or if a driver of the vehicle in which the traffic information communication system 200 applies the brakes or performs some other action that confirms a potential threat or could lead to a nearby vehicle colliding with the vehicle in which the traffic information communication system 200 is installed.

If the traffic information communication system 200 determines to rebroadcast the message, the message may be coded onto an electrical transmit signal t(t) and provided to the transmit antenna 216 for transmission on a wireless carrier signal. A CDMA code from the CDMA code space that has not been used recently, e.g., within a predetermined period of time, may be randomly selected for the coding. Alternately or additionally, the message may be updated before being rebroadcast to include, for instance, a response to the message that is initiated by the traffic information communication system 200, a number of hops from an original source of the message to the vehicle in which the traffic information communication system 200 is installed, or the like or any combination thereof.

In some embodiments, the decision to rebroadcast the message may be performed by the processor 208 of FIG. 2. Alternately or additionally, the coding of the message into the electrical transmit signal t(t) may be performed by the transmitter 202 of FIG. 2.

At block 316, the traffic information communication system 200 determines whether the message includes an urgent warning. In some embodiments, the message is determined to include an urgent warning if traffic conditions identified in the message represent an imminent threat to the vehicle in which the traffic information communication system 200 is installed. Examples of imminent threats include, but are not limited to, an abrupt stop by one or more vehicles on a thoroughfare ahead of a vehicle in which the traffic information communication system 200 is installed, an emergency vehicle approaching the vehicle in which the traffic information communication system 200 is installed, or a traffic light behind a bend in the thoroughfare ahead of the vehicle where the traffic light is about to transition to or has already transitioned to red.

The determination at block 316 may be based on one or more of the message content detected and processed at block 304, the deceleration 308, and/or the distance 312. For instance, the traffic information communication system 200 may determine that the traffic conditions represent an imminent threat to the vehicle in which the traffic information communication system 200 is installed if, based on factors such as a current speed of the vehicle, the deceleration 308, the distance 312 and the message content detected and processed at block 304, an amount of time in which an action such as braking at the vehicle may be taken to avoid a collision or otherwise respond to the imminent threat is less than a predetermined amount of time. In some embodiments, the decision at block 316 may be made by the processor 208 of FIG. 2.

Alternately or additionally, the traffic information communication system 200 may determine that the message includes an urgent warning if the message is received redundantly from the same communication node over at least two different CDMA channels (or FDMA or OFDMA channels), if the message is received over a CDMA channel (or FDMA or OFDMA channel) reserved for urgent warnings, if the message is received repeatedly over a same CDMA channel (or FDMA or OFDMA channel) from a communication node, and/or if an initial transmission power of a wireless carrier signal including the message is greater than a default initial transmission power.

If the traffic information communication system 200 determines at block 316 that the message includes an urgent warning, at block 318 the traffic information communication system 200 may initiate a warning to a driver of the vehicle regarding an imminent threat or initiate autonomous control of an aspect of operation of the vehicle.

If a warning is initiated to the driver, the warning may include a visual warning such as a flashing light or other indicator on a dashboard, instrument panel or display area of the vehicle, an aural warning such as a beep or tone, a computer-generated verbal warning, a tactile warning, or the like or any combination thereof. The warning may identify the imminent threat. For instance, a verbal warning may audibly state to the driver "Braking ahead," "disabled vehicle ahead on shoulder," "prepare to brake for traffic light," "move to shoulder for approaching emergency vehicle," or the like, depending on the nature of the imminent threat.

Figure 4:
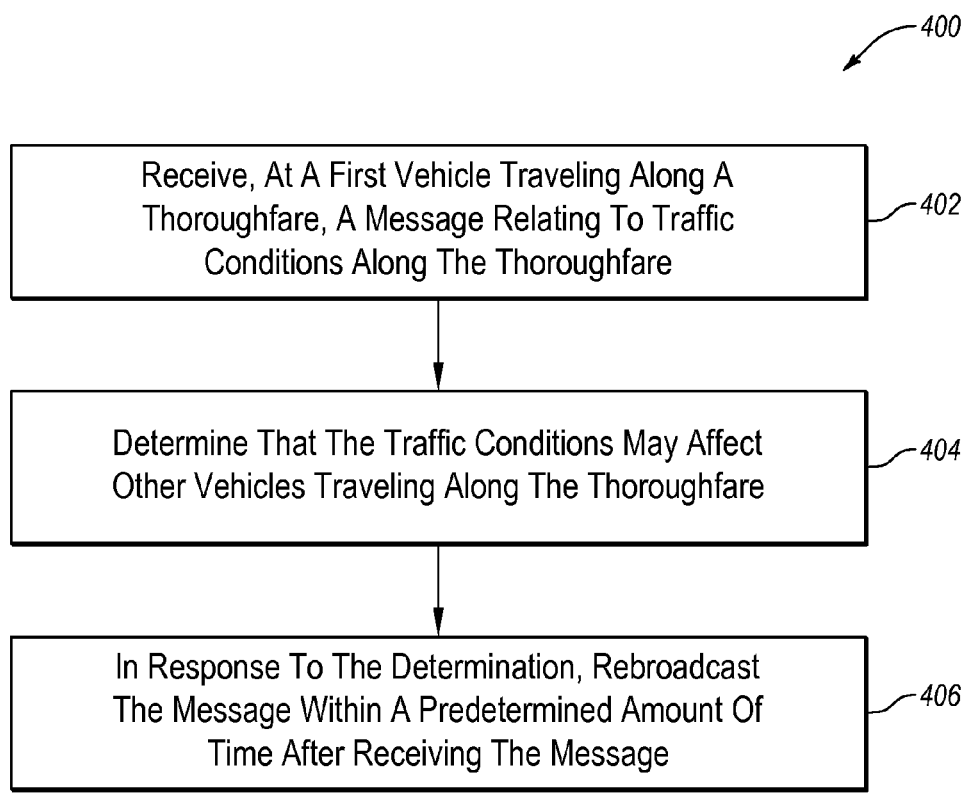
FIG. 4 is a flowchart of an example method of providing communications regarding traffic conditions.

FIG. 4 is a flowchart of an example method 400 of providing communications regarding traffic conditions, arranged in accordance with at least some embodiments described herein. The method 400 may be implemented in some embodiments by a traffic information communication system, such as the traffic information communication system 200 of FIG. 2. The method 400 may begin at block 402, in which a message relating to traffic conditions along a thoroughfare is received at a first vehicle traveling along the thoroughfare.

In block 404, it is determined that the traffic conditions may affect other vehicles traveling along the thoroughfare. Determining that the traffic conditions may affect other vehicles traveling along the thoroughfare may include determining that the first vehicle is within a predetermined distance of an original source of the message, or of a relay source of the message. An original source of a message refers to a communication node at which a message was originally generated, while a relay source of a message refers to a communication node that rebroadcast the message. Depending on the traffic conditions represented by the message and/or other factors, it may be desirable for the first vehicle to decelerate or swerve to avoid a collision with the original source or the relay source, which action may create a potential threat for other vehicles traveling along the thoroughfare.

Alternately or additionally, determining that the traffic conditions may affect other vehicles traveling along the thoroughfare may include determining that at least a predetermined number of messages relating to the traffic conditions were received at the first vehicle from other vehicles in front of the first vehicle on the thoroughfare. In these and other embodiments, redundant messages may be indicative of widespread traffic conditions or urgent traffic conditions that should be rebroadcast to other vehicles.

Alternately or additionally, determining that the traffic conditions may affect other vehicles traveling along the thoroughfare may include determining that a driver of the first vehicle who was warned about an imminent threat represented by the traffic conditions applied brakes in the first vehicle or took some other action to confirm the imminent threat or that could lead to a threat to other vehicles traveling along the thoroughfare.

In block 406, in response to the determination at block 404, the message is rebroadcast within a predetermined amount of time after receiving the message. For instance, the message may be rebroadcast over a CDMA, FDMA, or OFDMA channel without waiting for the absence of traffic on a shared transmission medium as is done in the CSMA protocol.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may further include determining that the traffic conditions represent an imminent threat to the first vehicle and at least one of: initiating a warning to a driver of the first vehicle regarding the imminent threat, or initiating autonomous control of an aspect of operation of the first vehicle. For instance, the imminent threat may include an abrupt stop by one or more vehicles on the thoroughfare ahead of the first vehicle, an emergency vehicle approaching the first vehicle along the thoroughfare, or a traffic light behind a bend in the thoroughfare ahead of the first vehicle where the traffic light is about to transition to or has already transitioned to red. The warning may include, but is not limited to, a verbal warning or a visual warning. Initiating autonomous control of an aspect of operation of the first vehicle may include, but is not limited to, automatically causing the first vehicle to decelerate, such as by applying the first vehicle's brakes.

Alternately or additionally, the method 400 may further include determining that the traffic conditions represent an imminent threat to other vehicles traveling along the thoroughfare. In response, the message may be rebroadcast using at least two different resource blocks, such as two different CDMA codes. Alternately or additionally, the message may be rebroadcast using a resource block, such as a CDMA code, reserved for urgent warnings. Alternately or additionally, the message may be repeatedly rebroadcast using a same resource block, such as a CDMA code. Alternately or additionally, the message may be rebroadcast with a transmission power greater than a default initial transmission power.

Alternately or additionally, the message may be received from a second vehicle traveling along the thoroughfare in front of the first vehicle. In these and other embodiments, the method 400 may further include determining a deceleration of the second vehicle and determining a distance between the first vehicle and the second vehicle.

Figure 5:
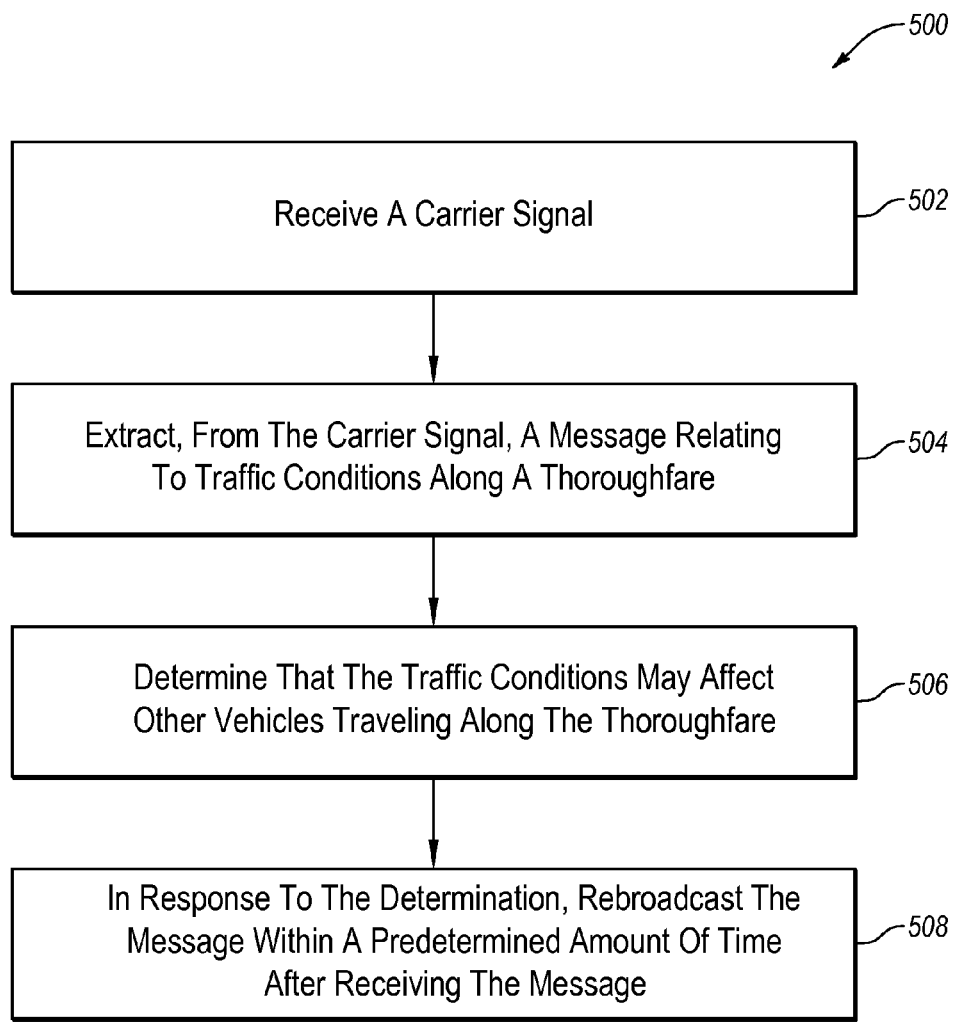
FIG. 5 is a flowchart of another example method of providing communications regarding traffic conditions, all arranged in accordance with at least some embodiments described herein.

FIG. 5 is a flowchart of another example method 500 of providing communications regarding traffic conditions, arranged in accordance with at least some embodiments described herein. The method 500 may be implemented in some embodiments by a traffic information communication system, such as the traffic information communication system 200 of FIG. 2. For instance, the processor 208 of the traffic information communication system 200 of FIG. 2 may be configured to execute computer instructions to cause the traffic information communication system 200 to perform operations for providing communications regarding traffic conditions as represented by one or more of blocks 502, 504, 506 and/or 508 of the method 500. The method 500 may begin at block 502, in which a carrier signal is received. For instance, the carrier signal may be received by the receive antenna 218 of FIG. 2.

In block 504, a message relating to traffic conditions along a thoroughfare is extracted from the carrier signal. For instance, the message may be extracted from the carrier signal by the receiver 204 of FIG. 2. As a particular example, if the carrier signal is a CDMA carrier signal, the message may be extracted from the CDMA carrier signal by the receiver 204 of FIG. 2 decoding the CDMA carrier signal.

In block 506, it is determined that the traffic conditions may affect other vehicles traveling along the thoroughfare. Determining that the traffic conditions may affect other vehicles traveling along the thoroughfare may include determining that the first vehicle is within a predetermined distance of an original source of the message, or of a most-recent source of the message. An original source of a message refers to a communication node at which a message was originally generated, while a most-recent source of a message refers to a communication node that rebroadcast the message. Depending on the traffic conditions represented by the message and/or other factors, it may be desirable for the first vehicle to decelerate or swerve to avoid a collision with the original source or the most-recent source, which action may create a potential threat for other vehicles traveling along the thoroughfare.

Alternately or additionally, determining that the traffic conditions may affect other vehicles traveling along the thoroughfare may include determining that at least a predetermined number of messages relating to the traffic conditions were received at the first vehicle from other vehicles in front of the first vehicle on the thoroughfare. In these and other embodiments, redundant messages may be indicative of widespread traffic conditions or urgent traffic conditions that should be rebroadcast to other vehicles.

Alternately or additionally, determining that the traffic conditions may affect other vehicles traveling along the thoroughfare may include determining that a driver of the first vehicle who was warned about an imminent threat represented by the traffic conditions applied brakes in the first vehicle or took some other action to confirm the imminent threat or that could lead to a threat to other vehicles traveling along the thoroughfare.

In block 508, in response to the determination at block 506, the message is rebroadcast within a predetermined amount of time after receiving the message. For instance, the message may be rebroadcast over a corresponding channel, such as a CDMA channel, an FDMA channel, or an OFDMA channel, without waiting for the absence of traffic on a shared transmission medium as is done in the CSMA protocol.

In some embodiments, the method 500 additionally includes determining a deceleration of a vehicle from which the carrier signal originated. The deceleration may be determined from a change in Doppler shift of the carrier signal over time, for example.

The method 500 may alternately or additionally include determining a distance between the processor and a vehicle from which the carrier signal originated. The distance may be determined from a signal attenuation of the carrier signal, for instance.

Based on one or more of content of the message, a deceleration of a first vehicle from which the carrier signal originated, and a distance between the first vehicle and a second vehicle in which the processor is installed, the method 500 may alternately or additionally include at least one of initiating a warning to a driver of the second vehicle or initiating autonomous control of an aspect of operation of the second vehicle.

Alternately or additionally, the method 500 may further include adding lane positioning information of a vehicle in which the processor is installed to the rebroadcast message.

In these and other embodiments, the message may specify a particular traffic condition such as, but not limited to, a vehicle failure, traffic congestion, or activated hazard flashers. Alternately or additionally, the message may be received from a first vehicle traveling along the thoroughfare in front of a second vehicle in which the processor is installed. The message may include at least one of: a current speed of the first vehicle, a deceleration of the first vehicle, a number of propagated hops of the message from an original source, a location of the first vehicle or another vehicle, or an identification of a particular traffic condition on the thoroughfare ahead of the second vehicle.

The cooperative vehicle collision warning system 102 described herein may coexist with other V2V/V2I systems. In particular, messages may generally be transmitted by vehicles in the cooperative vehicle collision warning system 102 only when a threat or potential threat is detected, which may typically be infrequent. Second, when message is transmitted, because it is not based on the CSMA protocol, it may generally be transmitted immediately without sensing the channel. Thus, it may preempt other V2V/V2I systems which use the same channel and implement the CSMA protocol. Accordingly, some embodiments described herein may be implemented in the 5.9 GHz DSRC band even though other V2V/V2I systems and/or other devices that implement the CSMA protocol may also operate in the same and/or an overlapping communication band.

Some thoroughfares include opposing traffic lanes such that vehicles may travel in opposite directions. For vehicles traveling along the thoroughfare in a first direction, some embodiments described herein may reduce interference from wireless carrier signals transmitted by vehicles traveling along the thoroughfare in a second opposite direction, as the messages carried thereby may not be relevant to vehicles traveling in the first direction. For instance, directional transmit antennas may be implemented to ensure that wireless carrier signals are directed primarily behind the transmitting vehicle and directional receive antennas may be implemented to ensure that wireless carrier signals are received primarily from in front of the receiving vehicle. Alternately or additionally, the relative speed between the transmitting vehicle in front and the receiving vehicle may be determined by, e.g., measuring Doppler shift. If the magnitude of the relative speed between the transmitting vehicle and the receiving vehicle is greater than that of the receiving vehicle, it may be determined that the transmitting vehicle is traveling in the opposite direction and the message may be disregarded.

In some embodiments, different traffic conditions such as car failure, traffic congestion, activated hazard flashers, and other traffic conditions may be differentiated by the receiving vehicle. For instance, the particular traffic condition may be identified in the message payload. Alternately or additionally, the receiving vehicle may consult and compare responses from relay sources such as relay vehicles, which responses may be identified in message payloads of rebroadcast messages received at the receiving vehicle. Classification rules provided in the traffic information communication system 200 and/or learned over time may be used to identify a particular traffic condition based on the relay vehicle responses, for instance, and/or other inputs.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present inventions have been described in detail, it should be understood that the various changes, substitutions, and alterations could be made hereto without departing from the spirit and scope of the invention.

What is claimed is:

1. A traffic information communication system comprising:
    a receiver configured to receive a message relating to traffic conditions along a thoroughfare from a communication node;
    a processor configured to determine that the message is an urgent message or a non-urgent message;
    a transmitter communicatively coupled to the receiver and configured to rebroadcast the message within a predetermined amount of time after receiving the message, wherein the traffic information communication system is implemented in a vehicle traveling along the thoroughfare, wherein:
        when the message is a non-urgent message, the transmitter is configured to rebroadcast the message at a default transmission power that indicates the message is a non-urgent message; and
        when the message is an urgent message, the transmitter is configured to rebroadcast the message at an initial transmission power that is greater than the default transmission power and that indicates the message is an urgent message; and
    a sensor installed in the vehicle and configured to detect a trigger, wherein the transmitter is further configured to generate and broadcast a warning message relating to a potential safety threat to other vehicles in response to detecting the trigger.

2. The traffic information communication system of claim 1, wherein:
    when the message is a non-urgent message, the transmitter is further configured to rebroadcast the message using a resource block from a first set of resource blocks reserved for non-urgent messages; and
    when the message is an urgent message, the transmitter is further configured to rebroadcast the message using a resource block from a second set of resource blocks reserved for urgent messages.

3. The traffic information communication system of claim 1, further comprising a deceleration module configured to determine a deceleration of the communication node by measuring a change over time in Doppler shift of a wireless carrier wave of the message.

4. The traffic information communication system of claim 1, wherein the message specifies a particular traffic condition comprising at least one of a vehicle failure or traffic congestion.

5. The traffic information communication system of claim 1, further comprising a directional antenna coupled to the transmitter, wherein the rebroadcast message is included in a wireless carrier signal emitted by the directional antenna and the directional antenna is positioned to emit the wireless carrier signal primarily toward a rearward travel path of the traffic information communication system.

6. The traffic information communication system of claim 1, wherein the receiver comprises:
    a code division multiple access (CDMA) receiver;
    a frequency division multiple access (FDMA) receiver; or
    an orthogonal frequency division multiple access (OFDMA) receiver.

7. The traffic information communication system of claim 1, further comprising a distance module configured to determine a distance between the communication node and the traffic information communication system by measuring attenuation of a wireless carrier wave of the received message, wherein an initial transmit power of the wireless carrier wave is known.

8. A method of providing communications regarding traffic conditions, the method comprising:
    detecting a trigger by a sensor installed in a first vehicle traveling along a thoroughfare;
    generating and broadcasting a warning message relating to a potential safety threat to other vehicles traveling along the thoroughfare in response to detecting the trigger;
    receiving, at the first vehicle, a message from a second vehicle relating to traffic conditions along the thoroughfare;
    determining that the message is an urgent message or a non-urgent message;
    determining that the traffic conditions may affect the other vehicles traveling along the thoroughfare; and
    in response to the determination that the traffic conditions may affect the other vehicles traveling along the thoroughfare, rebroadcasting the message within a predetermined amount of time after receiving the message, wherein:
        when the message is a non-urgent message, the message is rebroadcast at a default transmission power that indicates the message is a non-urgent message; and when the message is an urgent message, the message is rebroadcast at an initial transmission power that is greater than the default transmission power and that indicates the message is an urgent message.

9. The method of claim 8, wherein:
when the message is a non-urgent message, the message is rebroadcast using a resource block from a first set of resource blocks reserved for non-urgent messages; and
when the message is an urgent message, the message is rebroadcast using a resource block from a second set of resource blocks reserved for urgent messages.

10. The method of claim 8, further comprising:
determining that the traffic conditions represent an imminent threat to the first vehicle; and
at least one of:
   initiating a warning to a driver of the first vehicle regarding the imminent threat; or
   initiating autonomous control of an aspect of operation of the first vehicle.

11. The method of claim 10, wherein:
the imminent threat comprises at least one of:
   an emergency vehicle approaching the first vehicle along the thoroughfare; or
   a traffic light behind a bend in the thoroughfare ahead of the first vehicle, where the traffic light is about to transition to or has already transitioned to red;
the warning comprises at least one of a verbal warning or a visual warning; and
initiating autonomous control of an aspect of operation of the first vehicle comprises automatically causing the first vehicle to decelerate.

12. The method of claim 8, further comprising determining that the traffic conditions represent an imminent threat to the first vehicle; wherein at least one of:
   the message is rebroadcast using at least two different resource blocks;
   the message is rebroadcast using a resource block reserved for urgent messages; or
   the message is rebroadcast repeatedly using a same resource block.

13. A processor configured to execute computer instructions to cause a system to perform operations for providing communications regarding traffic conditions, the operations comprising:
   detecting a trigger by a sensor installed in a first vehicle traveling along a thoroughfare;
   generating and broadcasting a warning message relating to a potential safety threat to other vehicles traveling along the thoroughfare in response to detecting the trigger;
   receiving, at the first vehicle, a message from a second vehicle relating to traffic conditions along the thoroughfare;
   determining that the message is an urgent message or a non-urgent message;
   determining that the traffic conditions may affect the other vehicles traveling along the thoroughfare; and
   in response to the determination that the traffic conditions may affect the other vehicles traveling along the thoroughfare, rebroadcasting the message within a predetermined amount of time after receiving the message, wherein:
      when the message is a non-urgent message, the message is rebroadcast at a default transmission power that indicates the message is a non-urgent message; and
      when the message is an urgent message, the message is rebroadcast at an initial transmission power that is greater than the default transmission power and that indicates the message is an urgent message.

14. The processor of claim 13, wherein:
when the message is a non-urgent message, the message is rebroadcast using a resource block from a first set of resource blocks reserved for non-urgent messages; and
when the message is an urgent message, the message is rebroadcast using a resource block from a second set of resource blocks reserved for urgent messages.

15. The processor of claim 13, wherein the operations further comprise determining a deceleration of the second vehicle by measuring a change over time in Doppler shift of a wireless carrier wave of the message.

16. The processor of claim 13, wherein the operations further comprise:
   determining that the traffic conditions represent an imminent threat to the first vehicle, and wherein the imminent threat comprises at least one of:
      an emergency vehicle approaching the first vehicle along the thoroughfare; or
      a traffic light behind a bend in the thoroughfare ahead of the first vehicle, where the traffic light is about to transition to or has already transitioned to red; and
   at least one of initiating a warning to a driver of the first vehicle regarding the imminent threat or initiating autonomous control of an aspect of operation of the first vehicle.

17. The processor of claim 13, wherein the operations further comprise determining that the traffic conditions represent an imminent threat to the first vehicle; wherein at least one of:
   the message is rebroadcast using at least two different resource blocks;
   the message is rebroadcast using a resource block reserved for urgent messages; or
   the message is rebroadcast repeatedly using a same resource block.

18. The traffic information communication system of claim 1, wherein:
   the sensor comprises a brake sensor configured to detect emergent braking in the vehicle;
   the sensor comprises a component sensor configured to detect failure of a particular vehicle component in the vehicle; or
   the sensor comprises both the brake sensor and the component sensor.

19. The method of claim 8, wherein detecting the trigger by the sensor installed in the first vehicle comprises at least one of detecting the trigger by a brake sensor configured to detect emergent braking in the first vehicle or detecting the trigger by a component sensor configured to detect failure of a particular vehicle component in the first vehicle.

20. The processor of claim 13, wherein detecting the trigger by the sensor installed in the first vehicle comprises at least one of detecting the trigger by a brake sensor configured to detect emergent braking in the first vehicle or detecting the trigger by a component sensor configured to detect failure of a particular vehicle component in the first vehicle.

* * * * *